May 26, 1953  E. G. AKERS  2,639,692
DEVICE FOR SEALING WIRE LINES, INCLUDING
A CABLE HAVING SPACED SEALING MEMBERS
Filed April 23, 1949
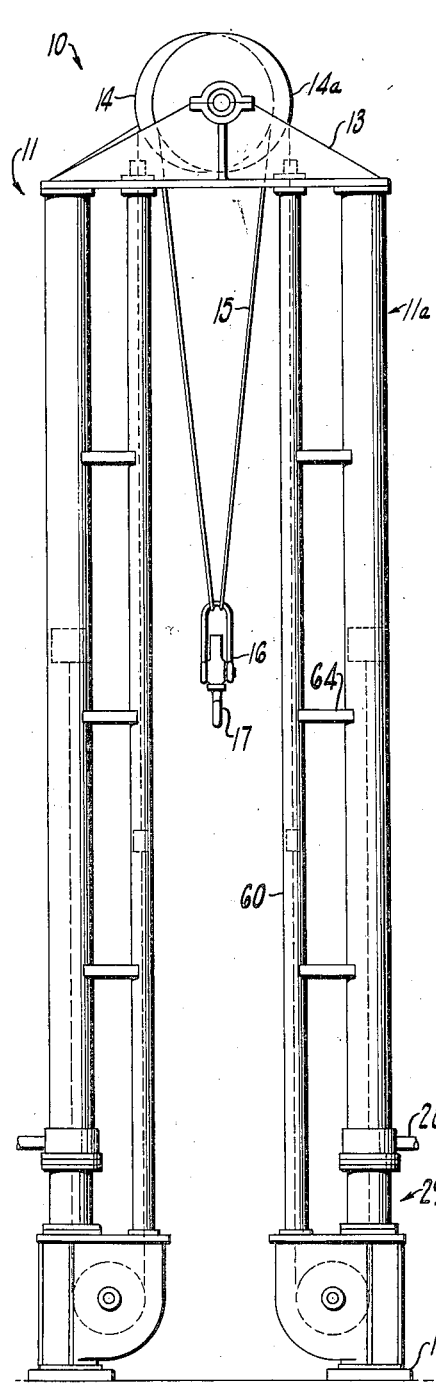
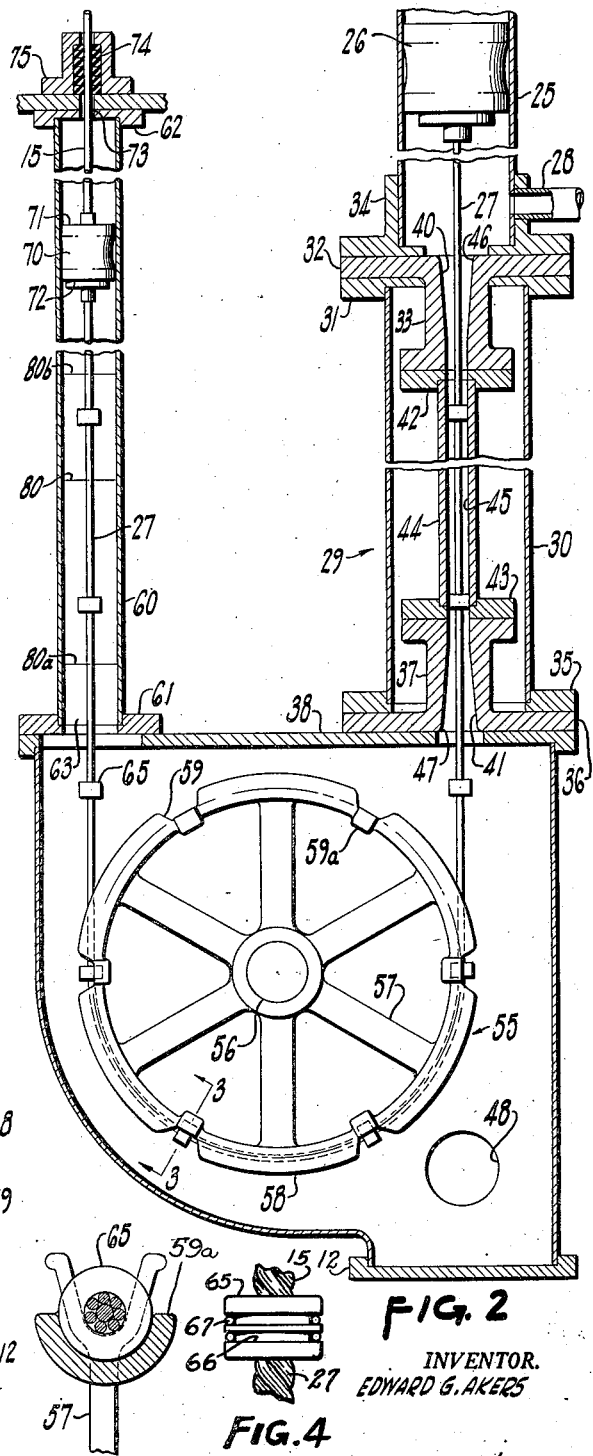
INVENTOR.
EDWARD G. AKERS
By Mellin and Hanscom
ATTORNEYS Patented May 26, 1953

2,639,692

UNITED STATES PATENT OFFICE 2,639,692

DEVICE FOR SEALING WIRE LINES, INCLUDING A CABLE HAVING SPACED SEALING MEMBERS

Edward G. Akers, Glendale, Calif., assignor to M. O. Johnston, Glendale, Calif.

Application April 23, 1949, Serial No. 89,351

5 Claims. (Cl. 121—46)

This invention relates to a device for sealing wire lines of hydraulically operable well drilling rigs and the like.

In one type of oil well drilling rig one or more upright cylinders are provided each having a piston reciprocable therein. A wire line or cable is fixed to the piston and the piston is actuated by means of hydraulic pressure. Thus, a pair of upright cylinders may be provided, a wire line fixed to the underside of each piston, passed through the lower end of the cylinder and over lower and upper sheaves and thence downwardly to a hook for pulling pipe or for carrying out other operations at an oil well.

In hydraulic rigs of this character, it is necessary to provide special sheathing or sealing means for the cable. Thus, a woven wire cable is not readily adapted to sealing by means of a bushing because of its rough, irregular surface. One effective means of sealing cables in this type of rig is that described in Mason, United States Patent No. 2,240,794, entitled "Drilling Lift," granted May 6, 1941, such means comprising a plurality of nestable or telescoping tubes. One such tube is fixed to the piston; another is fixed to one end of the cylinder. Any number of intermediate telescoping tubes are provided as may be necessary. These tubes are in their retracted, nested position at one end of the piston stroke and are in their extended position at the other end of the piston stroke.

A nestable tube arrangement for sealing the wire line of an hydraulic rig is, however, subject to certain disadvantages. Thus, the nestable tubes, being movable parts and having bearing surfaces, must be accurately machined. Also damage thereto will result in difficulties of operation.

It is an object of the present invention to provide alternative means of sealing wire lines of the character described and by such means to avoid some of the difficulties presented by nestable tubes.

It is a particular object of the invention to provide a means of sealing an hydraulically operated wire line cable, or which avoids the necessity of using nestable tubes, which provides effective sealing or sheathing for any length of stroke of the piston, and which is simple and inexpensive to fabricate and to operate.

These and other objects of the invention will be apparent from the ensuing description and the appended claims.

One form which the invention may assume is exemplified in the following description and illustrated by way of example in the accompanying drawings in which:

Fig. 1 is a view in front elevation of the device of the invention.

Fig. 2 is a fragmentary view thereof taken in vertical section and showing certain details of construction.

Fig. 3 is a section taken along the line 3—3 of Fig. 2 also showing certain details of construction.

Fig. 4 is a view in elevation of one of the spools or sealing members.

Referring now to the drawings, the device of the invention, as illustrated in Fig. 1, is generally designated as 10 and it comprises identical left and right hand units 11 and 11a, respectively. Each of the units 11 and 11a rests upon a base 12 and may be further supported and stabilized by any suitable means (not shown). A crown block 13 is supported at the upper end of the device and left and right hand sheaves 14 and 14a, respectively, are journaled in the crown block. Wire lines or cables 15 are operated by the device. The wire lines 15 are led over the sheaves 14 and 14a and are brought together and secured at one end to a swivel 16 supporting a hook 17, which in turn may, for example, support a string of drill pipe.

Each of the units 11 and 11a comprises an upright main cylinder 25 within which a piston 26 is reciprocable. Fixed to the lower end of the piston 26 is a connecting cable 27. A supply conduit 28 is provided near the bottom of the cylinder 25 for introducing hydraulic fluid into and bleeding hydraulic fluid from the cylinder for the purpose of actuating the piston 26. Disposed beneath the main cylinder 25 is a sealing unit 29 comprising a cylindrical section 30. The cylindrical section 30 is provided with an upper flange 31 which is bolted or otherwise secured to the flange 32 of an upper guide section 33 and to a flange 34 welded to the lower end of the cylinder 25. The cylinder 30 is also provided with a lower flange 35 which is bolted or otherwise secured to the flange 36 of a lower guide section 37 and to a casing 38. As illustrated, the upper guide section 33 is provided with a downwardly tapering guide throat 40 and the lower guide section 37 is provided with a similarly but upwardly tapering guide throat 41. Disposed between the upper and lower guide sections 33 and 37 and secured thereto by means of flanges 42 and 43, is a sealing tube 44 having a central bore 45 which is aligned with and constitutes a continuation of the tapered guide throats 40 and 41. The upper guide throat 40 opens at its upper end at 46 into the lower end of the main cylinder 25 and the lower guide throat 41 opens at its lower end at 47 into the casing 38.

The casing 38 is provided at the bottom with an opening 48 which communicates through a conduit (not shown) with an oil reservoir (not shown) for a purpose described hereinafter. Rotatably disposed within the casing 38 is a sprocket 55 carried on a shaft 56 which is journaled in the casing. The sprocket 55 has spokes 57 and a concave or grooved rim 58 which is recessed at uniform intervals about its circumference to provide recesses 59 and 59a for a purpose described hereinafter.

An auxiliary or sealing cylinder 60 also forms a fixed part of the structure, such cylinder being provided at its lower end with a flange 61 bolted or otherwise fixed to the casing 38, and at its upper end with a flange 62 similarly fixed to the crown block 13. The cylinder 69 is open at its lower end at 63 to the casing 38 and therefore is in communication with the main cylinder 25 through the casing 38, lower guide throat 41, bore 45 of sealing tube 44 and upper guide throat 49. As also illustrated, the sealing cylinder 60 lies parallel to and is fixed to the main cylinder 25 by means of girts 64. The sealing cylinder and main cylinder thus form, in effect, a unitary, sturdy, rigid structure in which the several parts re-enforce one another.

To the connecting cable 27, at regularly spaced intervals, are affixed a plurality of spools or annular sealing members 65 having annular grooves 66 in which O rings or other suitable annular sealing members 67 are seated. The spools 65 are fixed or clamped firmly to the cable by any suitable means so that their spacing remains constant. It will be seen that the spools 65 are spaced apart a distance less than the length of the sealing tube 44. Also, the spools 65 are of a diameter to slide freely through the lubricated interior of the tube 44, but to seal the same. It will thus be apparent that the tube 44 will at all times be sealed, and that pressure in cylinder 25 cannot be communicated with casing 38 and cylinder 60.

The spools 65 are received within the cups 59a formed in the sprocket 55. The cable 27 is led under the sprocket 55 and upwardly through the sealing cylinder 60, and at its other end it is fixed to a wiping piston 70 having lip seals 71 and 72. To the upper end of the piston 70 is fixed one of the wire lines or cables 15 which passes upwardly through an opening 73 formed in the upper end of the sealing cylinder 60 and in the crown block 13, thence through a plurality of stacked, annular rubber wipers 74 which are clamped in place by means of a retainer 75.

In operation the device of the invention functions as follows: When it is desired to lift a load by means of the hook 17, fluid pressure is admitted to the main cylinders 25 through the conduits 28, thus elevating the main pistons 26 which, of course, will pull upon the connecting cables 27 and will lower the sealing piston 70, thus pulling on the wire lines 15 and elevating the hook 17. As stated, the casing 38 is open at 48 to an oil reservoir or large body of oil at low pressure, thus maintaining oil in the casing and in the sealing cylinder 60 at an average level indicated as 80. Meanwhile one or more spools 65 will always be in sealing engagement with the sealing tube 44 thus preventing leakage of hydraulic fluid from the main cylinder 25 into the casing 38 and thence into the sealing cylinder 60. The wiping piston 70 will wipe the walls of the cylinder 60 clear of any dirt that may find its way through the annular wipers 74, thus preventing dirt or other contamination from reaching the cylinder 60 and hence eventually becoming mixed with the hydraulic fluid in the main cylinder 25.

It will be apparent that, as each of the spools 65 travels upwardly through the bore 45 in the sealing tube 44, it will carry with it a slug of hydraulic fluid which, as the spool passes into the upper guide throat 40, will enter the main cylinder 25. The diameter of the sealing tube 44 is, however, relatively small; therefore, only a relatively small and unobjectionable quantity of hydraulic fluid will be transferred from the casing 38 to the main cylinder 25. The spools 65 will, of course, work against the main pistons 26, but since the spools 65 have a much smaller area, this is not a factor of great significance. At the end of the downstroke of the wiping piston 70, the liquid level in the sealing cylinder 60 will be lowered to the level indicated as 80a.

When it is desired to lower a load, hydraulic pressure is allowed to bleed from the cylinder 25 through the conduit 28. Any load carried by the hook 17 will cause it to move downwardly, thus elevating the wiping piston, pulling the connecting cables 27 and lowering the main pistons 26. Each time a spool 65 passes downwardly through the bore 45 into the lower tapered guide throat 41, it will carry with it a slug of fluid into the casing 38, raising the liquid in the sealing cylinder 60 to the level indicated at 80b.

It will be apparent that each of the units 11 and 11a is operable by itself. However, it is preferred to operate two units simultaneously, with two wire lines and two crown sheaves disposed axially with respect to each other and symmetrically disposed with respect to the center line of the well, as illustrated. Better balance and other advantages result from this arrangement.

It will thus be apparent that an hydraulic device has been provided for operating a wire line in an oil well drilling rig or the like. Such device is operable by displacement or travel of a piston in a cylinder under the influence of hydraulic pressure and it is capable of operating a wire line or cable. The device obviates the necessity of using telescoping tubes or the like for sealing the cable to prevent escape of hydraulic fluid and pressure and entry of dirt or other contamination. It will further be apparent that the device thus is simple in its construction and operation, and that it very effectively serves the purposes and achieves the objects set forth hereinabove.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. A device of the character described comprising a cylinder having an opening for ingress and egress of fluid pressure, a piston reciprocable therein, a cable fixed at one end to said piston, means for sealing said cable comprising a tubular sealing member having a guide throat at each end, one of said guide throats communicating with said cylinder, and sealing members affixed to said cable in axially spaced relationship and in slidable, sealing engagement with said tubular member, the spacing of successive sealing members being less than the length of said tubular member, a chamber communicating with the other guide throat and having an opening for communicating with a large volume of hydraulic fluid at a low pressure, a sprocket rotatably mounted within said chamber and having radially spaced means for receiving said sealing members, an auxiliary cylinder communicating with said chamber, a wiping piston in slidable, sealing engagement with said auxiliary cylinder and fixed to the other end of said cable, a wire line fixed to the other end of said wiper piston, and annular cable wiping means disposed at the upper end of said auxiliary cylinder, slidably receiving said wire line and operable to wipe the same free of dirt and the like.

2. A device of the class described comprising a cylinder having an opening for ingress and egress of fluid pressure, a piston reciprocable therein, a cable fixed at one end to and operated by said piston, means for sealing said cable comprising a tubular member communicating with said cylinder and sealing members fixed to said cable in axially spaced relationship and in slidable, sealing engagement with said tubular member, the spacing of successive sealing members being less than the length of said tubular member, a hollow body having the interior thereof communicating with the tubular member, an auxiliary cylinder communicating at one end with the interior of said body, and a wiping piston in slidable, sealing engagement with said auxiliary cylinder and fixed to the other end of the cable.

3. A device of the class described comprising a cylinder having an opening for ingress and egress of fluid pressure, a piston reciprocable therein, a cable fixed at one end to and operated by said piston, means for sealing said cable comprising a tubular member communicating with said cylinder and sealing members fixed to said cable in axially spaced relationship and in slidable, sealing engagement with said tubular member, the spacing of successive sealing members being less than the length of said tubular member, a hollow fluid-tight body adapted to contain hydraulic fluid and having the interior thereof communicating with the tubular member, said fluid-tight body serving to prevent dust, dirt and the like from contaminating the hydraulic fluid within the body, an auxiliary cylinder communicating at one end with the interior of said body, a wiping piston in slidable, sealing engagement with said auxiliary cylinder and fixed to the other end of the cable, and a wire line or the like secured by one end to said piston and extending out the other end of the auxiliary cylinder in sealed relation with respect thereto.

4. A device of the class described comprising a cylinder having an opening for ingress and egress of fluid pressure, a piston reciprocable therein, a cable fixed at one end to and operated by said piston, means for sealing said cable comprising a tubular member communicating with said cylinder and sealing members fixed to said cable in axially spaced relationship and in slidable, sealing engagement with said tubular member, the spacing of successive sealing members being less than the length of said tubular member, a hollow fluid-tight body having the interior communicating with the tubular member, said body having an opening therein for communication with a large volume of hydraulic fluid at a low pressure, said fluid-tight body serving to prevent dust, dirt and the like from contaminating the hydraulic fluid within the body, an auxiliary cylinder communicating at one end with the interior of said body, and a wiping piston in slidable, sealing engagement with said auxiliary cylinder and fixed to the other end of the cable.

5. A device of the class described comprising a cylinder having an opening for ingress and egress of fluid pressure, a piston reciprocable therein, a cable fixed at one end to and operated by said piston, means for sealing said cable comprising a tubular member communicating with said cylinder and sealing members fixed to said cable in axially spaced relationship and in slidable, sealing engagement with said tubular member, the spacing of successive sealing members being less than the length of said tubular member, a hollow fluid-tight body having the interior communicating with the tubular member, said body having an opening therein for communication with a large volume of hydraulic fluid at a low pressure, said fluid-tight body serving to prevent dust, dirt and the like from contaminating the hydraulic fluid within the body, an auxiliary cylinder communicating at one end with the interior of said body, a wiping piston in slidable, sealing engagement with said auxiliary cylinder and fixed to the other end of the cable, a wire line or the like secured by one end to said piston and extending out the other end of the auxiliary cylinder, and wipers on said other end of said auxiliary cylinder and engaging said wire line to wipe the same free of dirt and the like.

EDWARD G. AKERS.

References Cited in the file of this patent

UNITED STATES PATENTS

| Number | Name | Date |
| --- | --- | --- |
| 575,520 | Grupelli | Jan. 19, 1897 |
| 945,971 | Maslin | Jan. 11, 1910 |
| 1,004,710 | Swazey | Oct. 3, 1911 |
| 1,756,910 | Fuller | Apr. 29, 1930 |
| 2,047,965 | Huffman | July 21, 1936 |
| 2,047,981 | Osgood | July 21, 1936 |
| 2,057,966 | Parrish | Oct. 20, 1936 |
| 2,180,795 | Christensen | Nov. 21, 1939 |
| 2,285,742 | Miller | June 9, 1942 |
| 2,385,946 | Schorer | Oct. 2, 1945 |
| 2,437,814 | Hallen | Mar. 16, 1948 |